United States Patent [19]

McCabe

[11] 3,757,516

[45] Sept. 11, 1973

[54] GEOTHERMAL ENERGY SYSTEM
[75] Inventor: Barkman C. McCabe, Los Angeles, Calif.
[73] Assignee: Magma Energy Inc., Los Angeles, Calif.
[22] Filed: Sept. 14, 1971
[21] Appl. No.: 180,342

Related U.S. Application Data
[63] Continuation-in-part of Ser. No. 114,212, Feb. 10, 1971, abandoned.

[52] U.S. Cl............................ 60/26, 60/38, 165/45
[51] Int. Cl............................................... F03g 7/00
[58] Field of Search........................... 60/26, 38, 36; 165/45

[56]      References Cited
       UNITED STATES PATENTS

| | | | |
|---|---|---|---|
| 2,593,963 | 4/1952 | Biggs | 60/38 |
| 3,274,769 | 9/1966 | Reynolds | 165/45 X |
| 3,140,986 | 7/1964 | Hubbard | 60/26 X |
| 3,470,943 | 10/1969 | Van Huisen | 60/26 X |
| 3,605,403 | 9/1971 | Aikawa | 60/26 |

FOREIGN PATENTS OR APPLICATIONS

| | | | |
|---|---|---|---|
| 135,306 | 11/1929 | Switzerland | 60/26 |

*Primary Examiner*—Martin P. Schwadron
*Assistant Examiner*—Allen M. Ostrager
*Attorney*—Albert L. Gabriel

[57]      ABSTRACT

Method and apparatus for the nonpolluting generation of electrical power by the economic utilization of geothermal energy that is accessible through widespread sources of regenerative geothermal hot water. A well provides access to a geothermal hot water source having a temperature substantially above the flash point for atmospheric pressure, this hot water being conducted through heat exchangers wherein its heat energy is transferred to a power fluid employed in a closed Rankine heat engine cycle to generate electrical power, the water then being injected back into the aquifer. The geothermal hot water is pressurized by deep well pump means to a discharge pressure above its saturated vapor pressure for the source temperature, and a pressure gradient above the saturated vapor pressure is maintained through the heat exchangers, whereby the hot water is restrained from flashing into steam throughout its circuit, thereby avoiding any substantial temperature drop between the source and the heat exchangers and preventing release of any substantial mineral deposits at any point in the circuit. The very small expenditure of power required for such pressurization produces a large increase in total plant power output and efficiency by, among other things, (1) providing a top temperature power fluid Rankine cycle, (2) avoiding fouling of the well and surface equipment with mineral deposits, (3) deriving power from all of the geothermal fluid rather than just a stream fraction thereof, (4) allowing use of a power fluid that is particularly efficient in the available temperature range, and (5) avoiding degeneration of the power fluid source and ecological damage by returning the geothermal fluid to the aquifer.

42 Claims, 6 Drawing Figures

United States Patent

McCabe

INVENTOR.
BARKMAN G. McCABE

GEOTHERMAL ENERGY SYSTEM

RELATED APPLICATIONS

This a continuation-in-part of my co-pending application Ser. No. 114,212, filed Feb. 10, 1971, for GEOTHERMAL ENERGY SYSTEM now abandoned.

BACKGROUND OF THE INVENTION

The principal sources of energy that are currently employed throughout the world for generating electrical power are fossil fuels, hydroelectric sources, and atomic reactors. The total power available today from all three of these sources is barely sufficient to fill current demands, yet demands for electrical power are increasing at a progressively rapid rate which will soon exceed the available power from these three conventional sources.

These energy sources that are currently the principal sources of electrical generating power are all attended by serious drawbacks which, coupled with their projected inability to keep up with increasing demands for electrical power, indicate a pressing need for a totally new energy source that is available in abundance in many areas throughout the world and is not attended by such drawbacks.

Fossil fuel generating plants currently provide the major portion of the world's electrical power, but the earth's fossil fuel reserves are becoming rapidly depleted, and it is now projected that they will no longer be available on any large scale after several more decades, particularly oil and gas. Other problems in connection with fossil fuel generating plants are that they are a major source of environmental pollution, principally chemical, but also thermal; the fuel supply costs for such generating plants are relatively high and will inevitably get higher as the sources of supply diminish, and they are vulnerable to transportation, labor, and political problems; and the handling and storage of fuels necessarily presents a serious safety hazard.

Hydroelectric generating plants, while generally non-polluting, represent a source of energy that is currently relatively limited for future development. The primary limitation of hydroelectric power generation is that practically all of the economic dam sites in more developed countries have already been developed.

The use of atomic reactors as a source of energy for generating electric power has been expanding rapidly in recent years, but it is still of limited scope, and it is currently coming under serious attack in many quarters because of some of its difficulties. For one thing, atomic generating plants are major sources of thermal pollution, and are potential sources of atomic radiation pollution. Such plants are possibly hazardous when they are placed near populous areas where the power is most needed. Atomic generating plants by their nature involve governmental control; they are expensive to construct; manufacture of the fuel units is a highly technical and expensive procedure; the fuel by its nature is degenerative and must be periodically replaced; and the discarded fuel units present a long term pollution problem of unforseeable consequences.

In addition to the foregoing, all three of the principal energy sources that are currently used for generating electrical power are of such a nature as to cause serious disruption of the ecology, which is likely to cause future problems of a magnitude that cannot today be forecast.

Geothermal energy has long been considered as a possible source of energy for generating electricity to supplement the conventional sources. Geothermal energy is an ideal energy source for generating electricity, not involving any of the serious drawbacks pointed out hereinabove that are associated with the conventional energy sources employed for generating electricity. Thus, geothermal energy does not produce significant pollution, chemical, thermal or atomic emissions. Being partially regenerative, tremendous amounts of geothermal energy are available in many areas throughout the world, within reasonable access to the world's major population areas. Capital investment costs, operating expenses, and the energy source itself, are economical, and it is safer than the conventional energy generation.

Despite these advantages of geothermal energy as a means for generating electric power, there are today only a few electric generating plants which utilize geothermal energy, and these are located at relatively isolated, selective geographical locations where there is either a good supply of dry steam or of very hot water having a temperature of 500° F. to 600° F. or more so that steam can be separated from the hot water. Such sources of dry steam and very hot water are so few and far between throughout the world that they can be harnessed only on a very small scale for generating electrical power, and they are not useful to any practical extent as a supplement or replacement for conventional energy sources used in generating electrical power.

Nevertheless, there are large resources of geothermal hot water in many regions throughout the world which contain sufficient geothermal energy for the widespread generating of electrical power. However, prior to the present invention these large geothermal hot water resources have remained completely untapped for this purpose for want of any practical, economic method or apparatus for extracting such geothermal heat energy and converting it to electrical power. All heat engines are limited by general thermodynamic laws, which dictate that heat energy can only be converted into mechanical energy by having heat flow from a hot source to a cold heat sink, the amount of mechanical work that can be converted from a unit of heat energy depending directly upon the temperature differential between the hot source and the cold sink. For most of the populous regions of the world, which are located in temperate and tropical regions, the ambient temperature is such that geothermal hot water sources must, for the temperature differential between the hot source and cold sink to be sufficient for the practical and economic generation of electrical power, have a temperature substantially above the flash point for atmospheric pressure.

The conventional method for harnessing such flashable hot water to generate electrical power in the few plants where this is being done is to let the hot water flow up out of the well under the power of its own flashing steam, to separate the available steam at the surface, and then to directly drive a steam turbine with this separated steam, discarding the remaining hot water. This will work fairly well for a few isolated sources of very hot water, generally about 500° F., where the water is low in dissolved mineral content. However, this conventional procedure is prohibitive for the vast majority of geothermal hot water sources because it involves large thermal losses and results in mechanical problems which are very detrimental to plant efficiency and cause rapid degeneration of the operation. Thus, thermal losses are large because flashing of the hot water into steam causes a large temperature drop from loss of the latent heat of vaporization, thus greatly reducing the already relatively critical temperature differential between the hot source and cold heat sink; also, the separated steam which drives the turbine has substantially less than the total heat energy that was contained in the geothermal hot water at the deep well source.

The mechanical problems referred to include both a serious problem of fouling by mineral deposits both in the well and in the steam separators, and also the fact that steam turbines for use with relatively low pressure steam are large and costly, and relatively inefficient. Respecting the mineral deposit problem, carbon dioxide is generally present in geothermal waters throughout the world, and is usually constitutes at least about 80 percent of the incondensable gases dissolved in the waters. Most geothermal waters throughout the world also contain dissolved calcium oxide or other minerals. The applicant has observed in many wells drilled by him that the conventional approach of allowing the geothermal hot water to flow up through the well under its own power results in release of carbon dioxide, and reaction thereof with the calcium and other minerals dissolved in the water will form calcium carbonate or other carbonates which precipitate out on the well casing in the flash zone, and which also precipitate out in steam separators at the surface, causing both the well bore and the steam separators to clog up. The well bore must be repeatedly reamed out in order to keep an adequate flow rate therethrough, but after multiple reamings the well is lost. Repeated cleaning of steam separators, reaming of the well, and finally replacement of the well render the procedure uneconomic and impractical.

A further problem in connection with this conventional approach of flowing the geothermal hot water under its own power and direct steam power generation with steam that is separated therefrom, is that the removal of the steam, which is pure water, from the fluid causes a regular and progressive increase in the saturation of the fluid with minerals, thereby causing the original chemical and mineral balance of the fluid as established at depth to become unbalanced in proportion of mineral or chemical constituents.

SUMMARY OF THE INVENTION

In view of these and other problems in the art, it is a general object of the present invention to provide novel method and apparatus for the practical and economic utilization for generating electrical power of the heat energy in geothermal hot water sources having a temperature substantially above the flash point for atmospheric pressure, thereby for the first time making available for the widespread generation of electrical power a large number of geothermal hot water sources located in many places throughout the world.

Another general object of the present invention is to provide novel method and apparatus for generating electrical power from geothermal energy that is available through the medium of geothermal hot water, wherein the maximum possible amount of the thermal energy of the geothermal hot water is captured and converted into electrical energy in a practical and economical way.

Another object of the invention is to provide novel method and apparatus for generating electrical power from the energy contained in geothermal hot water, wherein the hot water is preserved in its liquid state, even though at ambient conditons it would separate into both its gaseous and liquid states, whereby the temperature of the hot water at its underground or recovery source is substantially preserved in the system to the point of utilization of the hot water for transfer of its heat energy into a closed Rankine cycle heat engine sytem, thereby obtaining the maximum temperature differential relative to ambient temperature at the point of use, for maximum thermal efficiency and hence power output of the Rankine cycle; and whereby there is no substantial release of carbon dioxide and consequent deposition of calcium carbonate or other carbonates either in the well or in surface equipment; hence the system will have a long operative life at substantially full power output.

Another object of the invention is to provide a system of the character described for generating electrical power from geothermal energy which is superior to the principal energy sources presently used for generating electrical power, namely, fossil fuels, hydroelectric energy, and atomic reactors, in a number of respects, including but not limited to its nonpolluting character, its widespread availability, relatively low capital expenditures required and operating costs, the regenerative character of the energy source, and the relative safety of the system.

Another object of the invention is to provide a novel geothermal-electrical system of the character described wherein, by means of a very small reinvestment of the power output into pumping for pressurization of geothermal hot water which would otherwise partially flash into steam, a very large gain is achieved in the total generated electrical power output of the system. Thus, for example, in a test well at Brady, Nevada, the bottom hole temperature is approximately 320° F., and when allowed to flow out of the well under the power of its own flashed steam, the flow rate is approximately 1,100 gallons per minute, and the delivery temperature at the top of the well is about 275° F. Thus, there is a temperature loss of about 45° F. between the underground recovery region and the surface. If a steam turbine is directly driven by steam flashed from this natural flow of geothermal hot water, the maximum electrical power output would be approximately 600 kw. This would be according to the conventional procedure. If, on the other hand, an attempt were made to recover the heat energy in the resulting flowed hot water by transferring the heat to a separate closed cycle system, the maximum theoretical electrical power output would be approximately 1,800 kw. However, by pressurizing the well according to the invention with a deep well pump driven by a 125 h.p. motor, 1,000 gallons per minute can be pumped to the surface at the bottom hole temperature of approximately 320° F., and by transferring the heat energy therefrom through heat exchangers into a closed Rankine cycle system, the energy recoverable therefrom as electrical power output is approximately 3,000 kw. The 125 h.p. required for this pumping is only about 95 kw., which is only about 3 percent of the total power output of the pressurized system. Thus, a major total generated power output increase is obtained by the reinvestment of only about 3 percent of the power back into the system. The amount of pumping horsepower required will vary with the height of the water column being lifted.

A further object of the invention is to provide a geothermal energy system of the character described for generating electrical power, which achieves maximum Rankine cycle efficiency in the conversion of the geothermal energy into mechanical and then electrical energy, by both providing a top Rankine cycle temperature to the closed system, and permitting utilization in the closed system of a power fluid of maximum efficiency within the available temperature range.

A still further object of the present invention is to provide novel method and apparatus of the character described wherein the body of geothermal hot water that is extracted from the ground and utilized to transfer its geothermal heat energy through heat exchangers into a closed cycle power system, is injected back into the aquifer in substantially the same mineral and chemical balance as it is removed so as to avoid disturbing the chemical and mineral balance of the geothermal water, thereby substantially preserving the natural balance of the underground geothermal system both for long-term use in the production of electrical power, and for avoiding potential damage to the ecology. This feature of the invention preserves the original chemical balance of the reinjected water, whereas if such a condition were not present it could be anticipated that reduced permeability of the injection zone would occur due to precipitation in the zone of excess minerals of a non-homogeneous fluid.

It is also an object of the invention to provide novel method and apparatus of the character described for converting geothermal energy into electrical energy, which is particularly suitable for development by private enterprise because of such factors as relatively low capital investment and operating costs, minimal requirement for land area, and lack of any requirement for strategic, highly technical or dangerous materials which must be government controlled. Additionally, the present method and apparatus lends itself to completely automated plant operation once a plant has been established, and plants employing the present invention are relatively invulnerable to transportation, labor, and political problems.

According to the invention, a well is drilled and cased to provide access to a source of geothermal hot water which will produce in large volume and will be regenerative by nature as to both the rate of flow and the temperature thereof if the body of hot water is injected back into the geothermal system after extraction of the heat energy therefrom. The geothermal hot water source that is selected has a temperature that is substantially above the flash point for atmospheric pressure, having a minimum temperature of at least about 240° F., and a preferred temperature of about 300° F. or higher. This geothermal hot water is conducted through heat exchangers wherein its heat energy is transferred to a power fluid employed in a closed Rankine heat engine cycle to generate electrical power, and the geothermal hot water is injected back into the aquifer. The power fluid that is employed in the closed Rankine cycle is selected for optimum performance in the temperature range of the heat exchangers, the presently preferred power fluid being isobutane which is particularly efficient in the available temperature range from most of the geothermal hot water sources to which the invention is applicable.

The geothermal hot water is pressurized, preferably by deep well turbine pump means, to a discharge pressure above its saturated vapor pressure for the temperature of the hot water where it is obtained at the bottom of the well, and a pressure gradient above the saturated vapor pressure of the hot water is maintained through the heat exchangers, so that no fraction of the hot water is allowed to flash into steam at any point throughout the geothermal circuit. This avoids any substantial temperature drop between the deep well source of the geothermal hot water and the entrance of the hot water into the heat exchangers, and in particular it avoids the major temperature drop that would otherwise occur through loss of the latent heat of vaporization of the flashed steam. This also prevents the release of any substantial mineral deposits, either in the well or in surface equipment. The pumping also gives a high velocity to the geothermal hot water as it passes through the heat exchangers, which is a further deterrent to fouling therein. The deep well pump employed for such pressurization may be driven by electrical power from the plant output, the pump requiring only a very small expenditure or reinvestment of power as compared to the very large increase in total plant power output and efficiency resulting from the pressurization.

Further objects and advantages of the present invention will appear during the course of the following part of the specification, wherein the details of construction, mode of operation, and novel method steps of a presently preferred embodiment are described with reference to the accompanying drawings, in which:

DETAILED DESCRIPTION

Referring to the drawings, FIGS. 1 to 4 diagrammatically illustrate method and apparatus according to the present invention in connection with a proposed prototype geothermal energy electric generating system for geothermal water that is recovered at approximately 325° F., the plant being for a nominal electric power output of approximately 8,100 kw.

Figure 1:
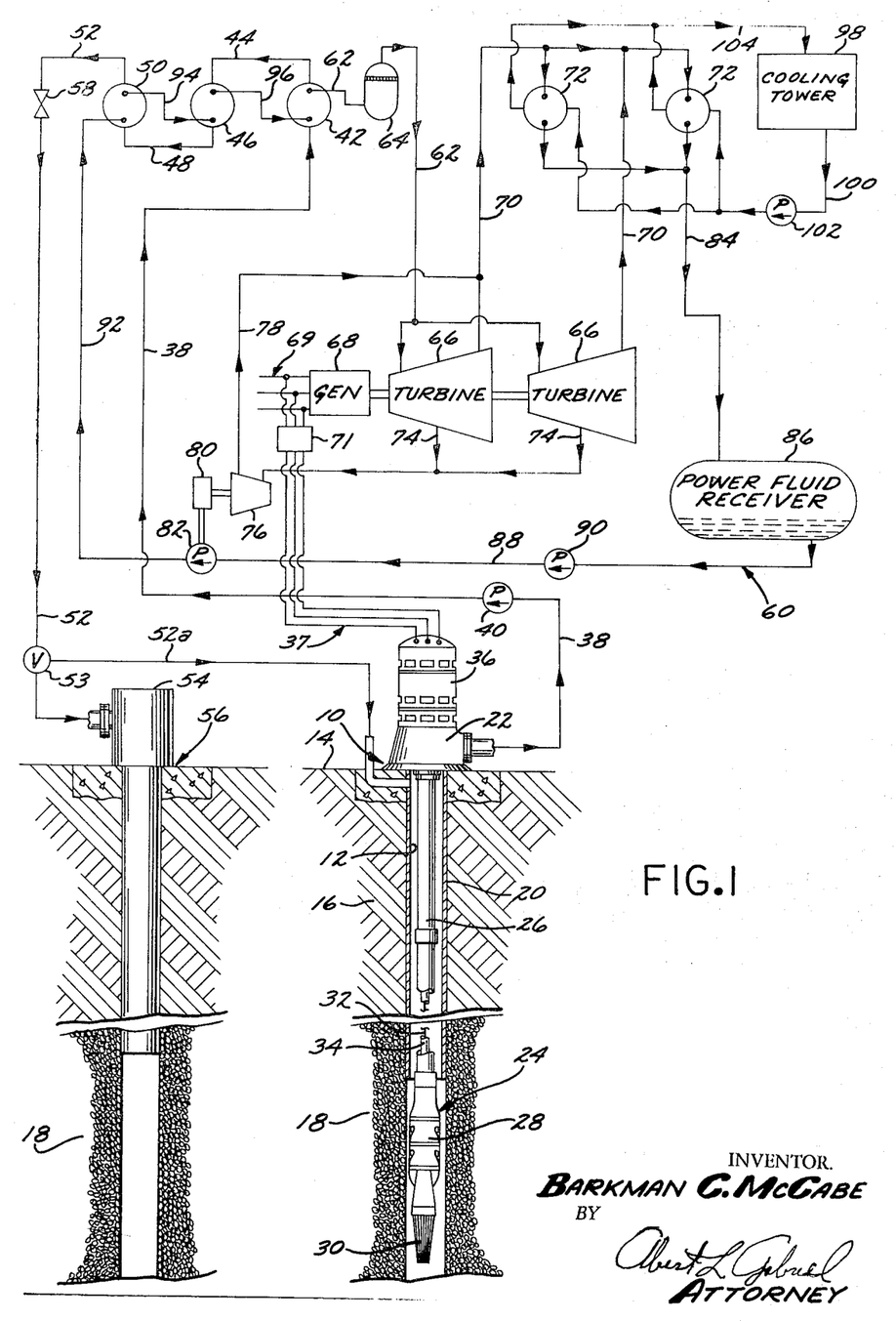
FIG. 1 is a diagrammatic view illustrating method and apparatus according to the present invention generally as applied to a proposed prototype plant of nominal generating capacity.

Referring at first to FIG. 1, the geothermal well providing access to the hot magmatic water is generally designated 10, and includes a well bore 12 extending down from the surface 14 of the ground through an earth formation 16 of low permeability which generally will be present to prevent steam from escaping from below, into a porous formation 18 which contains the hot geothermal water. A casing 20 extends downwardly into well bore 12 from the surface 14 into the region of the porous formation 18, and is cemented in proximate the surface according to conventional practice.

The well has a discharge heat structure 22, and suspended therefrom, down through the casing 20 and into the well bore 12 in the region of porous formation 18, is a turbine pump generally designated 24. The pump 24 includes a tubular water column 26 which extends downwardly through the well from the discharge head structure 22 and supports turbine bowls 28 at its lower end, the bowls 28 being disposed in the lower portion of the well, being generally submerged in the hot geothermal water of the formation 18. Supported below the turbine bowls 28 is a perforated liner or strainer 30 through which the geothermal hot water flows into the turbine pump 24. The turbine pump 24 also includes turbine drive shaft 32 that is enclosed within a tube 34 centrally disposed within the water column 26, the shaft 32 being driven by a motor 36 that is mounted on the discharge head structure 22. The motor 36 is preferably an electric motor that is driven by electrical power furnished through conductors 37. The amount of electrical power required to drive the motor 36 is only a very small percentage of the total electric power output of the plant, and this small amount of electrical power is preferably derived from the plant output.

The power consumption of the pump motor 36 will depend both upon the flow rate of geothermal hot water by the pump to the heat exchanger system to provide the required amount of heat energy to the plant, and upon the amount of pressurization which the pump must continuously apply to the geothermal hot water at the deep well source so as to maintain a pressure at the well discharge head 22 that is above the saturated vapor pressure of the geothermal hot water for the temperature of the hot water at the recovery zone, i.e., where it is recovered from the porous formation 18 through the perforated liner or strainer 30 at the bottom end of the pump column. The power required for pumping will also be determined in part by the height of the water column being pumped. For the proposed prototype plant illustrated in FIGS. 1 to 4, wherein the deep well temperature of the geothermal hot water at the recovery zone is approximately 325° F., the saturated vapor pressure for water at this temperature is approximately 96 psia. Accordingly, in the illustrated example, the deep well pump is energized so as to provide the required volumetric flow at a pressure above 96 psia. Preferably, the pressurization is maintained with approximately a 50 percent safety margin above this minimum pressure represented by the saturated vapor pressure for the source temperature, to provide positive assurance against any possible flashing of the geothermal hot water into steam despite any fluctuations which might occur in the system. Accordingly, for the illustrated example wherein the geothermal hot water has a recovery temperature of about 325° F., the deep well pump will pressurize the hot water to a discharge pressure at the well head 22 of approximately 145 psia.

The hot geothermal water is delivered from the discharge head 22 through a conduit 38, which may have the booster pump 40 therein, to a first heat exchanger 42, wherein the geothermal hot water gives up some of its heat energy to the power fluid for superheating the power fluid. The hot water then passes from the first heat exchanger 42 through a conduit 44 to a second heat exchanger 46 wherein the geothermal hot water gives up more of its heat energy for vaporizing or boiling the power fluid. The geothermal hot water then passes from the second heat exchanger 46 through a conduit 48 to a third heat exchanger 50 wherein the remaining useful heat energy from the geothermal hot water is transferred to the power fluid to preheat the power fluid. From the third heat exchanger 50 the geothermal hot water than passes through a return conduit 52 to the head structure 54 of an injection well 56, wherein the body of the geothermal fluid that was pumped out of the ground from the well 10 is flowed back into the ground so as to be returned to the water containing formation 18. This injection well 56 may either be a closed well as illustrated in FIG. 1, or it may be an open return well, and in either case the body of the fluid is returned to the earth therethrough. In this way, the natural balance of the geothermal system is preserved, and the geothermal fluid is, in effect, simply returned back to the earth for a recharge of thermal energy from the hot magma or molten rock within the earth which is in heat conducting relationship with the hot water-bearing formation. The injection well 56 is spaced a sufficient distance from the extraction well 10 so that the cooled geothermal fluid that is returned to the ground therethrough does not materially disturb the temperature of the fluid recovered in the well 10.

In addition to the requirement of the invention that the geothermal hot water be pressurized by the deep well pump means to a discharge pressure above its saturated vapor pressure for the source temperature, it is also essential according to the invention to maintain a pressure gradient throughout the geothermal hot water circuit wherein the pressure is at all points in the circuit above the saturated vapor pressure of the hot water at the respective points. While this is the minimum critical pressure gradient for the invention, it is preferred that a safety factor of an additional 50% be embodied in the actual pressure gradient for an operative system such as the one illustrated in FIGS. 1 to 4 of the drawings. The booster pump 40 that is shown disposed in the hot water delivery conduit 38, while optional, is useful to include in a practical system so as to maintain the desired margin of safety in the hydraulic gradient through the heat exchangers. While the booster pump 40 is shown in the delivery conduit 38, it may be desirable to dispose it elsewhere in the circuit as required to maintain the desired pressure gradient, as for example in the conduit 44 between the first and second heat exchangers 42 and 46, respectively. It is also desirable to include a throttle valve 58 in the return conduit 52 to the injection well, so as to permit establishment of an optimum pressure gradient through the heat exchangers, although the pressure gradient through the heat exchangers can be controlled by appropriate conduit sizing so that back pressures are simply built up by the conduit dimensions themselves.

Figure 2:
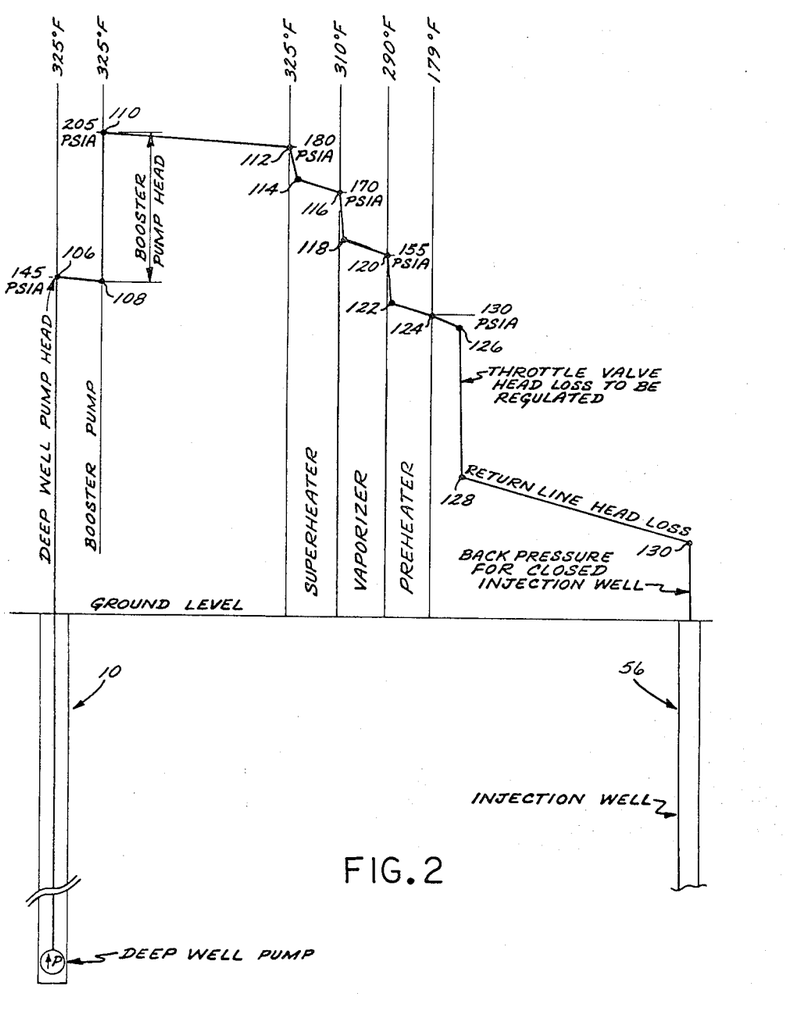
FIG. 2 is a chart approximately illustrating the hydraulic pressure gradient for the geothermal hot water circuit portion of the diagram in FIG. 1.

FIG. 2 is a chart that roughly illustrates the hydraulic gradient for the geothermal hot water circuit portion of the proposed prototype plant illustrated in FIG. 1, and it will be seen in this chart that the pressures throughout the heat exchanger portion of the circuit are maintained considerably above even the 50 percent safety margin, both as an assurance against any flashing of the hot water into steam, and to provide a flow rate of the hot water which is optimum for the heat transfer in the heat exchangers. FIG. 2 will be discussed more in detail hereinafter.

Returning to FIG. 1, the closed cycle power system for the Rankine heat engine cycle is generally designated 60, and this system for the proposed prototype plant utilizes isobutane - $(CH_3)_3CH$ - as the power fluid. Isobutane is a presently preferred power fluid for use with the present invention because it is particularly efficient in the temperature range obtainable through heat exchangers from the hot water for a large proportion of the geothermal hot water sources throughout the world to which the invention is applicable. Thus, the present invention is most likely to be applied in connection with geothermal hot water sources that are in the range of from about 300° F. to about 400° F., for which range the isobutane is particularly efficient as a power fluid that receives its heat energy from the geothermal hot water through heat exchangers and is employed in a Rankine heat engine cycle wherein power generation is accomplished by energy recovery in gas expansion power turbines.

While a large number of the available geothermal hot water sources throughout the world are in this range of from about 300° F. to about 400° F., the minimum geothermal hot water source temperature for satisfactory application of the present invention is about 240° F., with the preferred source temperature being at least about 300° F. There is no upper limit for the geothermal hot water source temperature to which the present invention is applicable, provided the materials and structural strengths designed into the deep well pump and hot water circuit components are capable of withstanding the high temperatures and the relatively high pressures which are associated with high temperatures in the present invention to maintain a well discharge pressure above the saturated vapor pressure of the water for the source temperature and to maintain a pressure gradient through the heat exchangers that is above the saturated vapor pressure of the hot water at the various points therein.

Geothermal hot water source temperatures in the range of from about 350° F. to 400° F. are presently considered to be optimum for efficient power plant production. The amount of power required to operate the deep well pump against such pressure is relatively low as compared with power production of the plant. Also, the pressure is sufficiently low so that well control is safe and plant equipment such as heat exchangers, pipes, pumps, valves and the like need not be excessively beefy and expensive. With a geothermal hot water source temperature of 375° F., which is presently considered to be an ideal source temperature, the well pressure to prevent flashing is about 185 psia, so that the deep well pumping pressure for the preferred 3/2 safety margin is about 278 psia.

However, some valuable sources of geothermal energy have geothermal hot water temperatures substantially above 400° F., as for example about 450° F. While the temperature difference between 450° F. and 375° F. is relatively small, this would cause a very large difference in the back pressure against the deep well pump. Thus, to prevent flashing, a pump pressure of about 422 psia must be provided, so that the deep well pumping pressure for the 3/2 safety margin would be about 633 psia. Accordingly, the increase of only 75° F. would raise the pumping pressure from about 278 psia to about 633 psia, or by a factor of about 2.3-to-one. Without some means to compensate for this large increase in pressure, there would be a great increase in power required to operate the deep well pump; well safety would become a much more critical problem, with the well being much more likely to "blow" and accordingly plant equipment would have to be made much more heavy and expensive.

This serious problem for geothermal hot water temperatures substantially above 400° F. is overcome according to the present invention by injecting at least a portion of the relatively cool effluent body of geothermal fluid from the plant into the annulus between the well casing 20 and the pumping column 26. The proportion of the effluent stream that is thus injected back into the primary well 10 is controlled so as to reduce the average temperature therein back down to a temperature that has a practical working pressure associated therewith, preferably an average temperature not greater than about 400° F.

Apparatus to accomplish this temperature, and hence pressure, reduction is diagrammatically illustrated in FIG. 1, and includes a bypass valve 53 in return conduit 52 selectively operable to divert any desired proportion of the effluent stream into a conduit 52a that communicates with the annulus between the well casing 20 and the pumping column 26. By this means all of the body of geothermal fluid is still reinjected back into the ground, but at least part of it is employed to bring the well temperature, and hence pressure, down within a more practical range.

Thus, despite higher than optimum temperatures for a particular geothermal hot water source, the present method and apparatus for reinjecting at least a portion of the effluent stream back into the primary well provides a great reduction in the pressure that must be handled in the power plant. This results in a large reduction in horsepower that must be supplied to the deep well pump, avoidance of the need for expensive and beefy high pressure equipment, and a major improvement in plant safety. It also allows the same basic plant design and equipment to be used for a much wider range of geothermal fluid temperatures, and allows the same power fluid to be used efficiently; thus, each plant need not be individually engineered according to the geothermal fluid temperature encountered in a particular geographical area. Additionally, thermal energy remaining in the effluent stream after passage through the heat exchangers is returned to the ground proximate the source for maximum conservation thereof.

Isobutane has a number of favorable characteristics for use as the power fluid in connection with the present invention, among which are the following: The volume flow per unit of power is quite low, thus allowing maximum power from a given size turbine, for example nearly double the power obtainable from an equivalent n-butane turbine of the same physical size. The heat transfer coefficients are good for isobutane; generally better than those for halocarbons. The critical temperature of isobutane is high enough so that theoretical Rankine cycle efficiency is good. The maximum pressure for a good Rankine cycle is not too high for moderate cost machinery housings. Latent heat is high for isobutane, being relatively higher than for halocarbons. Isobutane is noncorrosive and is stable at all operating conditions. The vapor pressure for isobutane is greater than atmospheric pressure at all ambient conditions, which is important so as to avoid vacuum operation that could, through air leakage, cause practical operating problems. Isobutane is relatively inexpensive, being much lower in cost than halocarbons.

Isobutane as used in the closed Rankine cycle of the present invention provides a great increase in plant efficiency over directly driving a turbine with steam that is separated from geothermal hot water according to the conventional prior art practice in geothermal-electric generating plants, even if such steam could be provided to the steam turbine at the same temperature as the isobutane can be provided to its turbine, which, of course, is not the case due to the large temperature drop that results from flashing the hot water into steam. Thus, isobutane has a molecular weight greater than three times that of steam, and a turbine exhaust pressure approximately 104 times that of steam, whereby an isobutane turbine is much smaller and more inexpensive than the same capacity steam turbine. The ratio of specific volume at exhaust to that at inlet is approximately 13.4 for isobutane and approximately 60.2 for steam at corresponding temperature conditions, whereby it is more difficult to design high efficiency blading throughout a steam turbine than an isobutane turbine, and as a result the overall efficiency of the isobutane turbine is likely to be substantially higher than that of the steam turbine. Since the isobutane turbine would be much smaller than the corresponding steam turbine, its rotor inertia should be correspondingly lower, thereby reducing the problem of excessive torque loads that tend to occur when a power line is shorted and throws a sudden excessive load on the generator. Unlike water, isobutane is almost completely noncorrosive, whereby no corrosion or deposits are likely to be formed on the turbine blades such as occurs on steam turbine blades, and the usual exotic alloys are not generally required in an isobutane turbine. The steam generally expands into its wet region, the resulting water causing erosion of the turbine blades, which is further aggravated by the fact that steam turbine blading operates at higher velocities than isobutane turbine blading; while isobutane expands entirely in the dry region in the Rankine cycle of the present invention, and no moisture occurs in the turbine exhaust.

While the presently preferred power fluid for the closed Rankine cycle of the present invention is thus isobutane, it is to be understood that the invention is not limited to the use of isobutane as a power fluid, and that other power fluids can be used within the scope of the invention, the power fluid to be selected for maximum power output from the available temperature differential. If desired a single flow of geothermal hot water may be employed to provide its highest temperature heat energy to a first power fluid for a first closed Rankine cycle system, and its lower temperature heat energy to a second power fluid in a second closed Rankine cycle system, with the first power fluid being selected for high efficiency at relatively high temperatures, and the second power fluid being selected for high efficiency at relatively low temperatures. For example, isobutane may be employed for the high temperature power fluid, and a Freon such as R-22 selected for the low temperature power fluid, the R-22 boiling at a lower temperature than the isobutane, and having a higher vapor pressure and vapor density for any particular temperature than the isobutane. In a practical dual power fluid system of this type a portion of the geothermal hot water may be diverted from the main geothermal stream at some intermediate stage in the chain of isobutane heat exchangers and this diverted hot water passed through one or more heat exchangers for the R-22 power fluid, and then returned to the mainstream for passage to the injection well.

With such separate power fluid systems, there would be two completely independent Rankine cycles, with separate turbines, power fluid pumps, and accessory equipment, and overall plant efficiency could, in some circumstances, be thus increased, by extracting more heat at the lower temperature end of the available temperature differential, with generally better thermal efficiency, smaller heat exchangers, and smaller turbines than required for a single cycle.

Similarly, the principles of the present invention could be applied through the use of three different power fluids, one for the high temperature end of the available temperature differential, another for the intermediate temperature range, and a third for the low temperature end, with three separate Rankine cycles utilized.

The power fluid is delivered in its superheated state from the heat exchanger 42 through a conduit 62 having a K.O. tank 64 therein to a pair of power turbines 66 that are drivingly connected to the electric power generator 68 which delivers electric power to output line means 69, a small fraction of the power from which may be delivered through suitable transformer or other conversion means 71 to the conductor means 37 for driving the geothermal well pump motor 36.

The power fluid, still in vapor form, leaves the turbines 66 through exhaust conduits 70 which pass the power fluid through condensers 72 wherein the waste heat is rejected from the power fluid as part of the Rankine cycle to convert all of the power fluid from its gaseous state into its liquid state.

A small portion of the power fluid is extracted from the power turbines 66 at intermediate stages thereof through extraction conduits 74 so as to drive the power fluid pump turbine 76, such portion of the power fluid being returned to the main power fluid exhaust stream through an exhaust conduit 78. The pump turbine 76 drives through a suitable speed reducer 80 to power fluid pump 82 which pressurizes the power fluid to its maximum operational pressure in the Rankine cycle prior to the introduction of the power fluid into the heat exchangers to receive heat energy from the geothermal hot water.

The liquid power fluid from condensers 72 is passed through conduit means 84 into a power fluid receiver 86, and the liquid power fluid is delivered therefrom at low pressure through a conduit 88 to the power fluid pump 82. If desired, a booster or primer pump 90 may be disposed in the conduit 88 and powered by any conventional means.

The power fluid from the primary power fluid pump 82 is delivered in its liquid state through high pressure power fluid conduit 92 into the heat exchanger 50, wherein the power fluid is heated but not vaporized. The power fluid then passes from heat exchanger 50 through conduit 94 into the heat exchanger 46 wherein the power fluid is vaporized or boiled, and then the power fluid passes through a conduit 96 into the heat exchanger 42, wherein the power fluid is superheated and provided its maximum temperature preparatory to driving the power turbines 66.

The waste heat that is extracted from the power fluid in the power fluid condensers 72 after the power fluid has delivered its energy to the turbines 66 and the turbine 76 is rejected to a cooling tower 98 or other conventional cooling means, such as a cooling pond or the like. This cooling tower 98 is part of a separate cooling water circuit which includes a conduit 100 that conducts cooling water from the tower 98 to a circulating pump 102 which circulates the cooling water through the condensers 72 and thence through a return conduit 104 back to the cooling tower 98.

It will thus be seen that there are three separate but cooperating fluid circuits employed in the conversion of the geothermal energy into electrical energy, namely, the geothermal hot water circuit, wherein the hot water is pumped up from the geothermal well and passed through the heat exchangers critically pressurized according to the invention and then reinjected into the ground; the power fluid circuit wherein the power fluid in superheated, pressurized condition passes through the power turbines to drive the electric generator, with a portion thereof driving the power fluid pump, and the exhausted power fluid is passed to condensers in vapor form and therein liquified, the liquid, low pressure power fluid being pressurized to operational pressure by the pump and passed through the heat exchangers to obtain heat energy from the geothermal hot water; and finally the cooling water circuit for condensing the gaseous power fluid into a liquid.

The hydraulic gradient chart shown in FIG. 2 rougly illustrates a suitable hydraulic pressure gradient for the geothermal hot water circuit portion of the proposed prototype generating plant illustrated in FIG. 1, for an example wherein it is assumed that all of the geothermal hot water is returned to the ground through the injection well 56. The chart of FIG. 2 is simply a means for better visually illustrating such hydraulic pressure gradient, and accordingly the various pressures and pressure differences shown therein are not drawn to scale.

Starting at the left-hand side of the chart in FIG. 2, the deep well pump applies pressurization proximate the bottom of the well 10, or in the region of the source of the geothermal hot water, which in this case is assumed to be approximately 325° F. In the example the deep well pump pressurizes this geothermal hot water to a well discharge pressure of approximately 145 psia, designated on the chart as pressure point 106. Since the saturated vapor pressure for water at 325° F. is approximately 96 psia, this provides a margin of safety of approximately 50 percent against any possible flashing of any of the geothermal water into steam during its traverse upwardly through the source well 10, or in the hot water delivery conduit 38 up to the booster pump 40 as illustrated in FIG. 1, the low pressure side of the booster pump 40 being designated in FIG. 2 as pressure point 108. While the booster pump 40 may be considered as optional equipment in the system, it nevertheless assists in providing the desired flow rate of the geothermal hot water through the heat exchangers, and at the same time raises the pressure head of the geothermal fluid to approximately 205 psia, which is slightly more than twice the saturated vapor pressure for water at 325° F. Pressure point 110 on FIG. 2 designates the booster pump output pressure of about 205 psia. The next pressure point in FIG. 2 is point 112, which represents the pressure at the input to the heat exchanger 42, which is the power fluid superheater, and pressure point 112 represents a pressure of approximately 180 psia, which is slightly below twice the saturated vapor pressure of about 96 psia for water at 325° F. The downard gradient slope from point 106 to point 108 and from point 110 to point 112 represents pressure drop in the conduit 38 which delivers the geothermal hot water from the well discharge head 22 to the heat exchanger 42.

A factor of critical importance in the present invention is that the pressurization from the deep well pump in the source well 10 to the pressure point 112 representing the input to the first heat exchanger, by not allowing any vaporization of any of the geothermal hot water, preserves the entire latent heat of vaporization content within the geothermal hot water, whereby the only loss of heat energy of the geothermal fluid as it passes up through the well 10 from the source proximate the deep well pump and hence through the discharge head 22 and delivery conduit 38 to the first heat exchanger 42 represented by the pressure point 112 results from conduction through the wall of the pump column, the discharge head, and the delivery conduit. However, this may be made minimal by providing the delivery conduit 38 with good thermal insulation. The spacing of the pump string from the well bore and casing, and the generally poor thermal conductivity of the earth, prevent any substantial conductive thermal loss as the hot water flows upwardly through the pump column. Thus, as illustrated in the chart of FIG. 2, the temperature of the geothermal hot water at each of the pressure points 106, 108, 110, and 112, up to the input of the first heat exchanger 42 is maintained at approximately 325° F., the conductive heat energy loss being relatively so small that there is no substantial drop in the temperature from the peak temperature for the geothermal hot water at the deep well source. Accordingly, a top Rankine cycle temperature range is imparted to the power fluid through the series of heat exchangers.

The sharply dropping gradient between pressure points 112 and 114 represents the substantial pressure drop that occurs in the heat exchanger 42, which is the power fluid superheater, and in this region the thermal energy imparted from the geothermal hot water to the power fluid will lower the hot water temperature from approximately 325° F. to approximately 310° F., which is the temperature of the hot water as it is conducted through the conduit 44 from heat exchanger 42 to the second heat exchanger 46. On the gradient chart the output of heat exchanger 42 is represented by the pressure point 114 and the input of heat exchanger 46 is represented by the pressure point 116, the gradient between these points representing the pressure drop in the conduit 44. The steep downward gradient between pressure points 116 and 118 represents the pressure drop in the second heat exchanger 46, which is the power fluid vaporizer or boiler, the thermal energy transferred to the power fluid therein reducing the temperature of the geothermal hot water from about 310° F. to about 290° F., which is the approximate temperature of the geothermal fluid in the conduit 48 extending from the output of heat exchanger 46 represented by pressure point 118 and the input of the third heat exchanger 50 which is represented by pressure point 120. The steep downward gradient between points 120 and 122 represents the pressure drop in the heat exchanger 50, which is the preheater, the pressure point 122 representing the pressure at the output of heat exchanger 50 where the geothermal hot water is passed into the return conduit 52. The major portion of the heat energy contained in the geothermal hot water is transferred to the power fluid in the preheater heat exchanger 50, the temperature of the hot water therein dropping from approximately 290° F. all of the way down to approximately 179° F.

The pressure point 116, which represents the input to the second heat exchanger 46, is approximately 170 psia, which is a little more than twice the saturated vapor pressure of approximately 78 psia for the approximately 310° F. temperature at that point. The pressure point 120 for the input of the third heat exchanger 50 represents approximately 155 psia, which is also more than twice the saturated vapor pressure of approximately 58 psia for the approximately 290° F. temperature of the geothermal hot water at that point. The approximately 179° F. temperature at the pressure point 124 which represents the output of the third heat exchanger 50 is, of course, below the flash point of the water at atmospheric pressure in most locations; nevertheless, the approximately 130 psia at point 124 assures against any of the hot water flashing into steam even at this downstream point in the hot water circuit.

The gradient between pressure points 124 and 126 represents pressure drop in the return conduit 52 upstream of the throttle valve 58, while the gradient between points 126 and 128 represents the pressure drop through the throttle valve 58. The throttle valve 58 can be adjusted for any desired pressure drop between the points 126 and 128, thereby maintaining the required pressure head in the series of heat exchangers to positively preclude any of the hot water from flashing into steam therein.

The gradient between pressure points 128 and 130 represents pressure head loss in the return line 52 from throttle valve 58 back to the injection well head 54, while the pressure point 130 illustrates the back pressure which may be applied by a closed injection well. It is to be understood, however, that the return line 52 may be so constricted as to provide the necessary pressure head in the heat exchangers even without the use of a throttle valve 58. It is also to be understood that if an open injection well is used in the system, and also in the case of some closed injection wells, there will not be any back pressure applied to the return conduit, as represented by the pressure point 130. In fact, in some injection wells there will a negative pressure head resulting from a water level that is substantially below ground level when the water level has stabilized after the geothermal fluid flow has been continued for a substantial period of time in the operation of the present invention. The pressure points 128 and 130 are maintained at such pressures that even in the return flow of the geothermal water back into the ground there is no possibility that any of the returning water can flash into steam.

Figure 3:
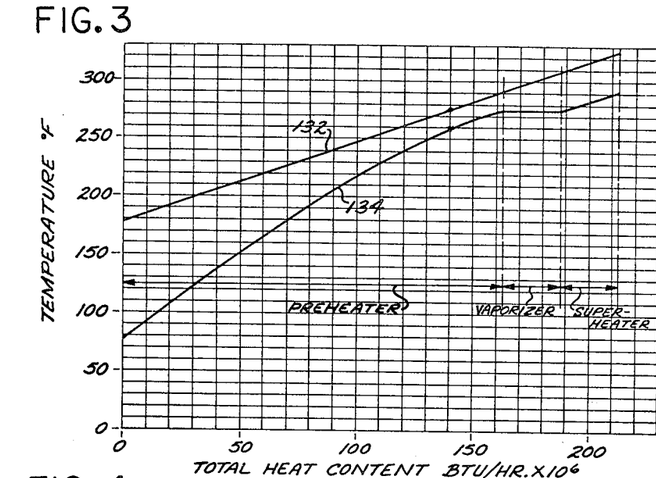
FIG. 3 is a graph illustrating the heat transfer performance in the heat exchangers of the proposed prototype plant illustrated in FIG. 1, including plots of temperature vs. total heat content for both the geothermal hot water and the closed Rankine cycle power fluid.

Referring now to FIG. 3, the upper curve 132 therein is a plot of temperature in degrees Fahrenheit against total heat content in millions of Btu's per hour for the geothermal hot water that is utilized in the proposed prototype plant illustrated in FIG. 1, assuming a flow rate for the geothermal hot water of 1,438,000 pounds per hour. The lower curve 134 in FIG. 3 is a plot of temperature in degrees Fahrenheit against total heat content in millions of Btu's per hour for the isobutane power fluid that is utilized in the proposed prototype plant illustrated in FIG. 1, for a flow rate of 1,032,000 pounds per hour for the isobutane. FIG. 3 illustrates the heat transfer performance in the heat exchangers of this proposed prototype plant, and is accordingly generally illustrative of the heat transfer performance from the hot magmatic fluid to the closed Rankine cycle power fluid in any electric generating plant embodying the method and apparatus of the present invention.

The right-hand end of the hot water curve 132 represents the temperature and heat content of the geothermal hot water as it enters the isobutane superheater 42, the temperature of the water at this point being approximately 325° F. As the geothermal hot water gives up its heat energy first through the superheater 42, then through the vaporizer or boiler 46, and finally through the preheater 50, the curve 132 for the hot water is traversed from right to left, the left-hand end of the curve 132 representing the point of departure of the geothermal hot water from the preheater 50, at which point the hot water has a temperature of approximately 179° F. The isobutane curve 134 is to be read from left to right to indicate the increased temperature and heat content thereof obtained first from the preheater 50, next from the vaporizer or boiler 46, and finally from the superheater 42, the temperature of the iosbutane ranging from about 76° F. as indicated at the left-hand end of curve 134 for entry of the isobutane into the preheater 50, up to about 290° F. as indicated by the right-hand end of the curve 134, representing the temperature and heat content of the isobutane as it leaves the superheater 42 to be provided to the power turbines 66.

It will be noted from FIG. 3 that approximately 90% of the temperature rise in the isobutane occurs in the preheater heat exchanger 50, and approximately 75 percent of the total heat energy that is transferred to the isobutane is also transferred within the preheater heat exchanger 50. This represents a highly efficient transfer of heat energy that is possible only in the liquid-to-liquid impedance match of the geothermal and power fluids within the preheater heat exchanger 50. Such efficient heat energy transfer is permitted only by maintaining the total body of geothermal hot water in its liquid state by pressurization according to the present invention, and not allowing any of the geothermal hot water to flash into steam, which would reduce this heat transfer efficiency. The heat transfer in the other two heat exchangers 46 and 42 is also rendered more efficient by maintaining the total body of geothermal fluid in its liquid state.

If the well were simply allowed to flow in accordance with conventional practice and thereby partially flash the geothermal hot water into steam, the heat exchange capability would not only be greatly lessened, but more important, the maximum hot water temperature would be reduced from 325° F. down to a temperature on the order of about 275° F., which would, even if the good heat transfer characteristics were maintained as illustrated in FIG. 3, still bring the maximum heat energy transferable to the power fluid as indicated by the curves 132 and 134 down to only about 65 percent of the heat transfer with the peak temperature afforded by the pressurization of the present invention. In practice, of course, this 65 percent figure would be further reduced by, among other things, the poorer heat exchanger efficiency and by a cumulative impairment of the geothermal water flow resulting from deposits that would be precipitated onto the wall of the well bore and in the heat exchangers as a result of some of the geothermal hot water flashing into steam.

It will be apparent from FIG. 3 that maximum heat transfer efficiency is obtainable in the heat exchangers by having the portions of the geothermal hot water circuit and the separate power fluid circuit that are in the heat exchangers arranged in a counterflow relationship, wherein the power fluid first enters the preheater and then successively passes through the vaporizer and the superheater, while the geothermal hot water flows oppositely, first entering the superheater, and then successively passing through the vaporizer and the preheater.

Figure 4:
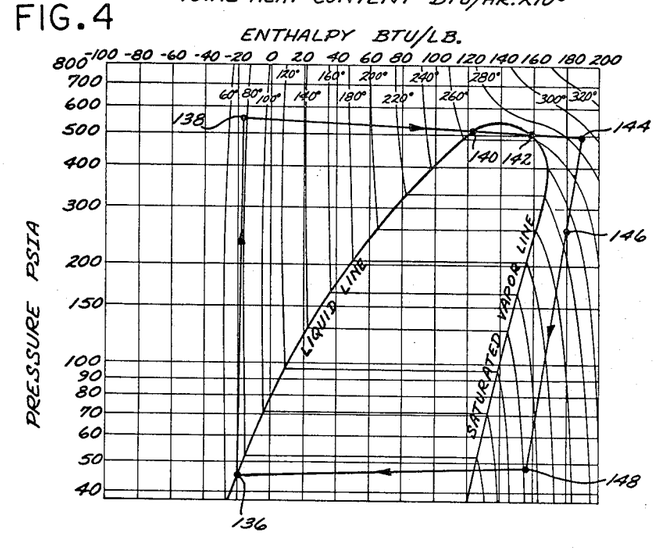
FIG. 4 is a pressure-enthalpy diagram illustrating the power fluid Rankine cycle for the proposed prototype plant illustrated in FIG. 1.

The pressure-enthalpy diagram in FIG. 4 illustrates the highly efficient top temperature Rankine heat engine cycle for the isobutane power fluid that is afforded by the deep well pump pressurization in the proposed prototype plant of FIG. 1, wherein the geothermal hot water source is furnished at approximately 325° F. In the diagram of FIG. 4, the ordinates represent pressure in psia at various points in the Rankine cycle, while the abscissas represent the corresponding enthalpy of the power fluid in Btu per pound. Constant temperature lines are superimposed over the pressure and enthalpy lines of the diagram. The Rankine cycle events for the power fluid are hereinafter described with reference to the state points 136, 138, 140, 142, 144, 146, and 148 on the diagram.

The state point 136 represents the condition of the power fluid in the receiver 86 of FIG. 1 prior to pressurization, the power fluid being in liquid form at its minimum temperature of about 76° F. and at a pressure of approximately 46 psia. The portion of the cycle between state points 136 and 138 represents pressurization of the power fluid by the pump 82, the liquid power fluid being pressurized up to above 500 psia without substantial change in temperature, and with only a very minor increase in enthalpy.

The enthalpy increase from state point 138 to state point 140 represents the heat energy transferred to the power fluid from the geothermal fluid in the preheater 50, and as was seen in FIG. 3, this is the major portion of the heat transfer. There is only a relatively small pressure drop between state points 138 and 140.

The enthalpy added between state points 140 and 142 represents the heat energy transferred to the power fluid from the geothermal fluid in the vaporizer or boiler 46, and in the range from point 140 to point 142 the power fluid is changed from its liquid state to its gaseous state, with only a relatively small drop in pressure.

The added enthalpy between state points 142 and 144 represents the heat energy transferred from the geothermal fluid to the power fluid in the superheater 42, and at the state point 144 the power fluid has a temperature of approximately 290° F., a pressure of approximately 500 psia, and an enthalpy of approximately 190 Btu per pound.

Thus, the total transfer of heat energy from the geothermal hot water to the power fluid is represented by the enthalpy difference between the points 144 and 138.

From point 144 down to point 146 represents the heat input from the power fluid to the turbines 66 to the extraction conduits 74 which provide a small portion of the power fluid to the pump turbine 76, and the portion of the diagram from point 146 to point 148 represents the remaining heat input to the power turbines 66 and to the pump turbine 76 from the extraction point to the turbine exhausts which lead to the condensers 72. It will be seen from FIG. 4 that the gas expansion in the turbines to provide mechanical energy thereto has resulted in the pressure of the power fluid dropping down to approximately 48 psia, which is close to its minimum pressure of point 136, and has also resulted in the enthalpy of the power fluid being reduced from approximately 190 Btu per pound down to approximately 154 Btu per pound. The power fluid remains completely in its gaseous state and substantially superheated above its saturated vapor condition for this pressure.

The portion of the diagram from point 148 back to point 136 represents the heat that is rejected from the power fluid in the condensers 72 to bring the power fluid back to the completely liquified, minimum enthalpy condition. The cycle then of course repeats at point 136.

Figure 5:
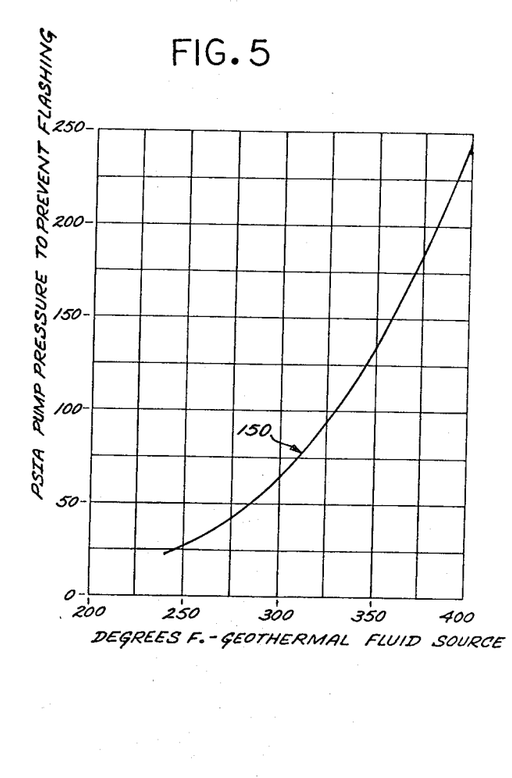
FIG. 5 is a graph plotting minimum deep well pump pressure against the temperature of the geothermal fluid at its source to prevent any of the geothermal hot water from flashing into steam in a system according to the present invention.

Referring now to the graph shown in FIG. 5, the curve 150 therein is a plot of the minimum geothermal well discharge pressure that must be provided by the deep well pump as a critical lower limit of the pressure according to the present invention for geothermal hot water source temperatures ranging from a minimum temperature of 240° F. up to a temperature of 400° F. It is to be understood that the curve can be projected for geothermal hot water sources at temperatures higher than 400° F. according to the corresponding absolute saturated vapor pressures of the fluid at such temperatures. It is also to be understood that in practice it is preferred to employ deep well pump discharge pressures that are substantially above the curve 150, and preferably having a safety margin of approximately 50 percent higher pressure than the critical pressure limit defined by the curve 150.

Figure 6:
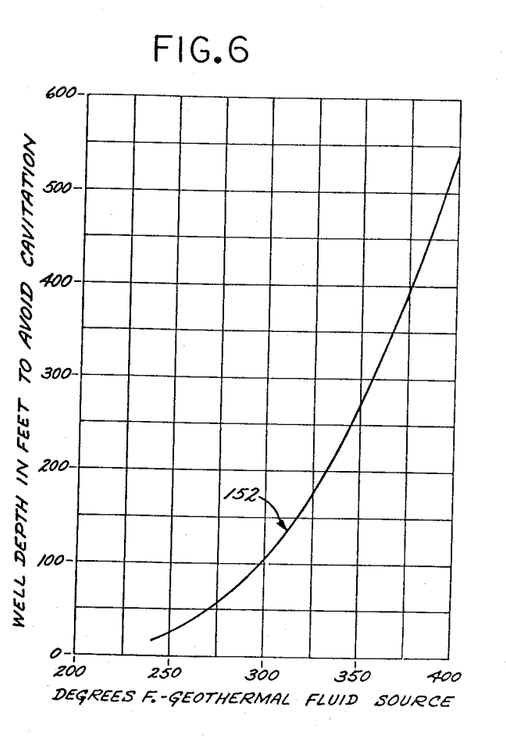
FIG. 6 is a graph similar to FIG. 5, but plotting well depth against the temperature of the geothermal fluid at its source to assure against cavitation of a deep well pump employed in accordance with the present invention.

Referring now to FIG. 6, the curve 152 thereof is a plot of well depth below the drawdown water level against the temperature of the geothermal fluid source in degrees Fahrenheit to provide complete assurance against any cavitation of the deep well pump that is employed in accordance with the present invention. In practicing the invention, the deep well pump is disposed in a geothermal hot water production zone wherein both the flow rate and the temperature are practical and economic for the size generating plant to be established. The pump must be submerged sufficiently deep so as to remain below the drawdown level of the body of geothermal hot water after the plant has been in continuous operation for a substantial period of time and equilibrium has been established in the geothermal hot water body. In addition to these criteria, in order to assure against cavitation of the deep well pump, it is preferable to dispose the pump sufficiently deep so that the summation of atmospheric and water pressures will be above the saturated vapor pressure for the geothermal hot water at the temperature of the geothermal hot water source. Curve 152 shows this depth below the drawdown water level for various source temperatures ranging from 240° F. to 400° F. to prevent cavitation. It will be understood that the curve may be projected to greater depths for higher geothermal hot water temperatures within the scope of the invention.

While it is preferred to dispose the deep well pump at the minimum depths illustrated in FIG. 6 for the corresponding temperatures, this may in practice be reduced by a steam pressure head which builds up between the casing and the water column in proportion to the absolute temperature of the water, and may also be reduced, if desired, by applying compressed air or other gases at the head of the well between the casing and the water column so as to further pressurize the body of geothermal hot water and thereby reduce the tendency for cavitation. The effectiveness of this compressed gas approach will, of course, depend on how well sealed the entire geothermal hot water system is, and a substantial period of time will normally be required to establish the desired degree of pressurization and maintain a steady level of gas pressure. However, once such gas pressurization has been established, the amount of energy which must be invested into its continuation is minimal, since it approaches a static pressure system.

While the instant invention has been shown and described herein in what are conceived to be the most practical and preferred embodiments, it is recognized that departures may be made therefrom within the scope of the invention, which is therefore not to be limited to the details disclosed herein, but is to be accorded the full scope of the appended claims.

I claim:

1. The method of generating electrical power from geothermal energy which comprises providing access through a well to an underground source of geothermal hot water having a temperature substantially above the flash point for atmospheric pressure, conducting a stream of said geothermal hot water from said source to an upper position remote from said source and placing said hot water into heat exchange relationship with a power fluid that is employed in a closed (Rankine) heat engine cycle to drive electric generator means, transferring the heat energy contained in said geothermal hot water to said power fluid in said heat exchange relationship, and restraining said geothermal hot water in said stream from flashing into steam from said source through said heat exchange relationship so as to transfer the heat energy from said geothermal hot water to said power fluid in a maximum Rankine cycle temperature range and to prevent mineral precipitation from said geothermal water.

2. The method of claim 1, wherein said stream of geothermal hot water is restrained from flashing into steam by pressurization thereof proximate said source to a well discharge pressure above the saturated vapor pressure of the geothermal water for the source temperature, and maintaining a pressure gradient above the saturated vapor pressure of the geothermal water through said heat exchange relationship.

3. The method of claim 2, wherein said pressurization of said stream proximate said source is to a well discharge pressure at least about 1½ times the absolute saturated vapor pressure of the geothermal water for the source temperature.

4. The method of claim 3, wherein said pressure gradient is also maintained at least about 1½ times the absolute saturated vapor pressure of the geothermal water through said heat exchange relationship.

5. The method of claim 2, wherein said pressurization is effected by deep well pump means proximate said source of geothermal hot water.

6. The method of claim 5, wherein said deep well pump means is driven by electrical power derived from said Rankine heat engine cycle.

7. The method of claim 5, wherein said deep well pump means is located at a sufficient depth in the well so that the geothermal hot water received by said pump means will be at a pressure greater than the saturated vapor pressure for the geothermal hot water at its received temperature.

8. The method of claim 7, wherein said depth is reduced by application of gas pressure through the well to the underground geothermal system so as to increase the pressure on the geothermal hot water source proximate the pump means.

9. The method of claim 1, wherein said temperature of said source of geothermal hot water is at least about 240° F.

10. The method of claim 1, wherein said temperature of said source of geothermal hot water is at least about 300° F.

11. The method of claim 1, wherein said power fluid is isobutane.

12. The method of claim 1, wherein the body of said geothermal hot water that is conducted from said source is conducted back into the underground geothermal system from which it was derived after passing through said heat exchange relationship, so as to preserve the natural mineral balance of the system.

13. The method of claim 1, wherein said stream of geothermal hot water and said power fluid have a counterflow heat exchange relationship through three stages, a first stage wherein the power fluid is preheated in a liquid-to-liquid heat exchange relationship, a second stage wherein the power fluid is vaporized in a liquid-to-liquid and gas heat exchange relationship, and a third stage wherein the power fluid is superheated in a liquid-to-gas heat exchange relationship, the majority of the heat energy transfer from said geothermal hot water to said power fluid occurring in said first stage.

14. The method of claim 1, wherein said stream of geothermal hot water is conducted into heat exchange relationship with a plurality of different power fluids employed in a plurality of respective closed Rankine heat engine cycle to drive said electric generator means, a portion of the heat energy contained in said geothermal hot water being transferred to each of said power fluids, the portion of said heat energy transferred to one of said power fluids being transferred in a relatively higher temperature range than the portion transferred to another of said power fluids.

15. The method of claim 1, wherein at least a portion of the body of geothermal hot water that has passed through said heat exchange relationship in injected back into said well so as to reduce the average temperature in the well and thereby reduce the well pressure required to prevent the geothermal hot water in said stream from flashing into steam.

16. The method of claim 15, wherein said temperature of said source of geothermal hot water is above about 400° F.

17. A system for generating electrical power from geothermal energy which comprises: a well providing access from the ground-level surface to an underground geothermal hot water source having a temperature substantially above the flash point from atmospheric pressure; conduit means communicating with said source to receive a stream of geothermal hot water therefrom and extending through said well to apparatus positioned adjacent said surface, said apparatus including electric generator means, Rankine cycle heat engine means drivingly connected to said generator means and including closed power fluid circuit means, heat exchanger means connected to said conduit means and to said power fluid circuit means and arranged to dispose said stream of geothermal hot water in heat exchange relationship with said power fluid so as to transfer the heat energy contained in said geothermal hot water to said power fluid; and pump means operatively associated with said conduit means pressurizing said stream to a well discharge pressure above the saturated vapor pressure of the geothermal water for the source temperature and maintaining a pressure gradient in said conduit means and in said heat exchanger means above the saturated vapor pressure of the geothermal water so as to restrain said geothermal hot water of said stream from flashing into steam from said source through said heat exchanger relationship, thereby transferring the heat energy from said geothermal hot water to said power fluid in a maximum Rankine cycle temperature range and preventing mineral precipitation from the geothermal hot water in said conduit means and in said heat exchanger means.

18. A system as defined in claim 17, wherein said pump means is adapted to pressurize said stream to a well discharge pressure at least about 1 ½ times the absolute saturated vapor pressure of the geothermal water for the source temperature.

19. A system as defined in claim 18, wherein said pressure gradient is at least about 1½ times the absolute saturated vapor pressure of the geothermal water.

20. A system as defined in claim 17, wherein said pump means includes a deep well pump disposed proximate said source of geothermal water.

21. A system as defined in claim 20, wherein said deep well pump is driven by electrical power derived from said generator means.

22. A system as defined in claim 20, wherein said deep well pump is located at a sufficient depth in the well so that the geothermal hot water received by said pump means will be at a pressure greater than the saturated vapor pressure for the geothermal hot water at its received temperature.

23. A system as defined in claim 17, wherein said temperature of said source of geothermal hot water is at least about 240° F.

24. A system as defined in claim 17, wherein said temperature of said source of geothermal hot water is at least about 300° F.

25. A system as defined in claim 17, wherein said power fluid is isobutane.

26. A system as defined in claim 17, which includes injection well means spaced from said well, said injection well means communicating with the underground geothermal system from which said geothermal hot water was derived and having sufficient capacity to accommodate the entire flow of said stream, and return conduit means extending from said heat exchanger means to said injection well means for returning said stream of geothermal hot water back into said underground geothermal system.

27. A system as defined in claim 26, which includes throttle valve means in said return conduit means permitting control of said pressure gradient in said heat exchanger means.

28. A system as defined in claim 17, which includes injection conduit means extending from said heat exchanger means to said well externally of said conduit means, said reinjection conduit means conducting at least a portion of the body of hot water that has passed through said heat exchanger means back into the well so as to reduce the average temperature in the well and thereby reduce the well pressure required to prevent the geothermal hot water in said stream from flashing into steam.

29. A system as defined in claim 28, which includes valve means operatively associated with said reinjection conduit means and selectively operable to divert a controlled proportion of said body of hot water back into the well.

30. A system as defined in claim 28, wherein said temperature of said source of geothermal hot water is above about 400° F.

31. A process for converting naturally occurring heat energy carried by water from an underground geothermal well source to mechanical energy comprising the steps of:
conducting a stream of said water from said source to an upper position remote from said source and passing said water in heat exchange relationship with an operating fluid having a critical temperature below the input temperature of the water;
superheating the operating fluid with head from the water;
expanding the operating fluid in a power extracting gas expansion device;
condensing the operating fluid after expansion; and
repeating the steps in a continuous process.

32. A process in accordance with claim 31 wherein the operating fluid is condensible at the output pressure of the gas expansion device in a heat exchanger with cooling fluid from a cooling tower operating at atmospheric conditions.

33. A process in accordance with claim 31 wherein the operating fluid has a boiling point below the boiling point of water.

34. A process in accordance with claim 31 wherein the operating fluid is a pure substance.

35. A process in accordance with claim 34 wherein the operating fluid is isobutane.

36. A process for converting heat energy carried by a hot fluid to mechanical energy comprising the steps of:
passing hot fluid heated by heat energy within the earth from an underground source to a first upper position remote from said source and placing said hot fluid into heat exchange relationship with an operating fluid having a critical temperature below the input temperature of the hot fluid;

superheating the operating fluid with the heat from the hot fluid;

expanding the operating fluid in a power extraction gas expansion device;

condensing the operating fluid after extraction; and repeating the steps in a continuous process.

37. A process in accordance with claim 36 comprising the further steps of raising the temperature of the operating fluid to where the operating fluid has sufficient superheat to avoid condensation in a prime mover.

38. A process in accordance with claim 36 wherein the operating fluid is condensible at the output pressure of the gas expansion device in a heat exchanger with cooling fluid from a cooling tower operating at atmospheric conditions.

39. A process for converting heat energy carried by a hot fluid to mechanical energy comprising the steps of:

in the first system, passing hot fluid heated by heat energy within the earth from an underground source to an upper position remote from said source and placing said hot fluid into heat exchange relationship with a first operating fluid having a critical temperature below the input temperature of the hot fluid;

superheating the operating fluid with the heat from the hot fluid;

expanding the operating fluid in a power extracting gas expansion device;

condensing the operating fluid after expansion;

repeating the steps in a continuous process;

and in a second system, passing at least a portion of the hot fluid in heat exchange relationship with a second operating fluid having a critical temperature below the temperature of the hot fluid after the hot fluid has passed in heat exchange relationship with the first operating fluid;

superheating the second operating fluid with the heat remaining in the hot fluid;

expanding the second operating fluid in a power extracting gas expansion device;

condensing the second operating fluid after expansion; and repeating the steps in a continuous process.

40. A process in accordance with claim 39 wherein the first operating fluid is a pure substance.

41. A process in accordance with claim 40 wherein the first operating fluid is isobutane.

42. A process in accordance with claim 39 wherein the first operating fluid is isobutane and the second operating fluid is freon.

* * * * *